US012767085B2

(12) United States Patent
Nakai et al.

(10) Patent No.: US 12,767,085 B2
(45) Date of Patent: Oct. 20, 2026

(54) GAS GENERATOR AND AIRBAG MODULE ASSEMBLY

(71) Applicant: DAICEL CORPORATION, Osaka (JP)

(72) Inventors: Shunji Nakai, Tokyo (JP); Nobuyuki Katsuda, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 19/277,721

(22) Filed: Jul. 23, 2025

(65) Prior Publication Data

US 2025/0346206 A1 Nov. 13, 2025

Related U.S. Application Data

(63) Continuation of application No. PCT/JP2023/046085, filed on Dec. 22, 2023.

(30) Foreign Application Priority Data

Jan. 24, 2023 (JP) ................................ 2023-008921

(51) Int. Cl.
*B60R 21/264* (2006.01)
*B01J 7/00* (2006.01)
(Continued)

(52) U.S. Cl.
CPC ............. *B60R 21/2644* (2013.01); *B01J 7/00* (2013.01); *B60R 2021/2607* (2013.01); *B60R 2021/26076* (2013.01); *F42B 3/04* (2013.01)

(58) Field of Classification Search
CPC . F42B 3/04; F42B 3/045; B60R 21/26; B60R 21/264; B60R 21/2644; B60R 2121/2607; B60R 2021/26076; B01J 7/00
(Continued)

(56) References Cited

U.S. PATENT DOCUMENTS 4,062,287 A * 12/1977 Millray ..................... F42B 3/04 222/3
6,378,901 B1 * 4/2002 Yamazaki ........... B60R 21/2644 280/736
(Continued)

FOREIGN PATENT DOCUMENTS

CN 104415710 A * 3/2015 ................ B01J 7/00
JP 2002326553 A 11/2002
JP 2005112302 A * 4/2005 ............. B60R 21/26

OTHER PUBLICATIONS

Machine Translation of JP-2005112302-A (Year: 2005).*
(Continued)

*Primary Examiner* — James S Bergin
(74) *Attorney, Agent, or Firm* — XSENSUS LLP

(57) ABSTRACT

A gas generator includes a gas generating agent that generates gas by combustion, a housing made of metal and accommodating the gas generating agent therein, the housing having a gas discharge port formed therein, through which the gas is emitted to an exterior of the housing, an ignition device configured to ignite the gas generating agent by actuation; and a temperature rise suppressing member provided in contact with an outer surface of a housing to cover at least a part of the outer surface. The temperature rise suppressing member includes an endothermic agent that absorbs heat of the housing by undergoing a chemical change or a state change by the heat of the housing when a temperature of the housing rises due to combustion of a gas generating agent, and a binder agent present together with the endothermic agent such that the temperature rise suppressing member has flexibility.

11 Claims, 7 Drawing Sheets

(51) Int. Cl.
*F42B 3/04* (2006.01)
*B60R 21/26* (2011.01)

(58) Field of Classification Search
USPC ......... 102/530, 531; 280/736, 740, 741, 742
See application file for complete search history.

(56) References Cited

U.S. PATENT DOCUMENTS

| | | | | |
|---|---|---|---|---|
| 6,805,377 | B2 * | 10/2004 | Krupp | C06D 5/06<br>280/736 |
| 11,548,470 | B2 * | 1/2023 | Danielou | B60R 21/26 |
| 2010/0123303 | A1 * | 5/2010 | Boucher | B60R 21/26<br>280/743.1 |

OTHER PUBLICATIONS

Machine translation of CN-104415710-A (Year: 2015).*
International Search Report mailed on Mar. 12, 2024, received for PCT Application PCT/JP2023/046085, filed on Dec. 22, 2023, 5 pages including English Translation.
Written Opinion mailed on Mar. 12, 2024, received for PCT Application PCT/JP2023/046085, filed on Dec. 22, 2023, 6 pages including English Translation.

* cited by examiner

GAS GENERATOR AND AIRBAG MODULE ASSEMBLY

CROSS-REFERENCE TO RELATED APPLICATIONS

The present application is a Continuation of International Patent Application No. PCT/JP2023/046085, filed on Dec. 22, 2023, which claims priority from Japanese Patent Application No. 2023-008921, filed on Jan. 24, 2023, the entire contents of each are incorporated herein by reference.

TECHNICAL FIELD

The present invention relates to a gas generator and an airbag module assembly.

BACKGROUND ART

A widely known gas generator accommodates a gas generating agent in a housing, combusts the gas generating agent by actuation of an igniter to generate gas, and releases the gas to the exterior of the housing. Such a type of gas generator is used, for example, to supply gas to an airbag or a seat belt retractor of an automobile.

When the gas generator is actuated, a surface of the housing is heated to a high temperature by conduction of combustion heat of the gas generating agent. For example, when the gas generator is actuated to expand and inflate the airbag, if the airbag comes into contact with a high-temperature housing, there is a concern about thermal influence on components disposed around the housing, such as melting of the airbag. In this regard, a gas generator is disclosed in which a heat insulating member is provided on a surface of a housing to suppress a temperature rise of a surface temperature of the housing (for example, Patent Document 1).

CITATION LIST

Patent Document

Patent Document 1: JP 2002-326553 A

SUMMARY OF INVENTION

Technical Problem

To more efficiently suppress a temperature rise of a housing after actuation of a gas generator, it is important to provide a member for suppressing the temperature rise in the housing with improved steady contact.

The technique according to the present disclosure has been made in view of the above circumstances, and an object of the present disclosure is to provide a technique by which it is possible to further effectively suppress a temperature rise of a housing after actuation of a gas generator.

Solution to Problem

Aspect 1

To solve the above problems, a gas generator according to one aspect of the present disclosure adopts the following configurations. That is, a gas generator according to the present disclosure includes a gas generating agent that generates gas by combustion, a housing made of metal, the housing accommodating the gas generating agent therein, the housing having a gas discharge port formed therein, through which the gas generated by combustion of the gas generating agent is emitted to an exterior of the housing, an ignition device configured to ignite the gas generating agent by actuation, and a temperature rise suppressing member provided in contact with an outer surface of the housing to cover at least a part of the outer surface, in which the temperature rise suppressing member includes an endothermic agent that absorbs heat of the housing by undergoing a chemical change or a state change by heat of the housing when a temperature of the housing rises due to the combustion of the gas generating agent, and a binder agent present together with the endothermic agent such that the temperature rise suppressing member has flexibility.

Aspect 2

In the above aspect 1, the binder agent may be mixed with the endothermic agent.

Aspect 3

In the above aspect 1 or aspect 2, the endothermic agent may include at least one type selected from the group consisting of fatty acid polycarbonate, magnesium carbonate, fumaric acid, and terephthalic acid.

Aspect 4

In any one of the above aspect 1 to aspect 3, the binder agent may include a compound having a hydroxyl group or a carbonyl group.

Aspect 5

In any one of the above aspect 1 to aspect 4, a content ratio of the endothermic agent in the temperature rise suppressing member may be 70% or greater and 95% or less, and a content ratio of the binder agent in the temperature rise suppressing member may be 5% or greater and 30% or less.

Aspect 6

In any one of the above aspect 1 to aspect 5, the housing may include a peripheral wall portion having a tubular shape, the peripheral wall portion having the gas discharge port formed therein, a first closing portion closing one end portion of the peripheral wall portion, and a second closing portion closing the other end portion of the peripheral wall portion, in which the gas discharge port may be formed at a position where a distance between the gas discharge port and the first closing portion is shorter than a distance between the gas discharge port and the second closing portion in an axial direction of the housing, and the temperature rise suppressing member may be provided on an outer surface of the first closing portion.

Aspect 7

In any one of the above aspect 1 to aspect 6, the housing may include a peripheral wall portion having a tubular shape, the peripheral wall portion having the gas discharge port formed therein, and the temperature rise suppressing member may be provided on an outer surface of the peripheral wall portion.

Aspect 8

In any one of the above aspect 1 to aspect 7, a contact portion of the outer surface of the housing with the temperature rise suppressing member may be formed to have recesses and protrusions.

Aspect 9

In any one of the above aspect 1 to aspect 8, the gas generator may further include a label sheet indicating predetermined information, in which the label sheet may be attached to the temperature rise suppressing member in such a manner that the temperature rise suppressing member is interposed between the label sheet and the housing.

Aspect 10

The technique according to the present disclosure can also be specified as an airbag module assembly including a gas generator. That is, another aspect of the present disclosure may be an airbag module assembly including the gas generator according to the above aspect 6, and an airbag disposed in a folded state, the airbag being configured to be expanded and inflated by the gas emitted from the gas discharge port, in which the gas generator may be disposed in such a manner that the first closing portion and the airbag in a folded state face each other.

Aspect 11

The airbag module assembly according to another aspect of the present disclosure may include the gas generator according to the above aspect 7, and an airbag disposed in a folded state, the airbag being configured to be expanded and inflated by the gas emitted from the gas discharge port, in which the gas generator may be disposed in such a manner that the peripheral wall portion and the airbag in a folded state face each other, and the temperature rise suppressing member may be provided on an outer surface of a portion of the peripheral wall portion facing the airbag.

Advantageous Effects of Invention

According to the present disclosure, it is possible to more efficiently suppress a temperature rise of a housing after actuation of a gas generator.

DESCRIPTION OF EMBODIMENTS

Embodiments according to the present disclosure will be described below with reference to the accompanying drawings. In the following embodiment, an aspect where the technique according to the present disclosure is applied to a gas generator for an airbag (inflater) will be described. However, the application of the technique according to the present disclosure is not limited thereto. For example, the technique may be applied to a gas generator for a seat belt retractor. Note that the respective configurations and the combinations thereof in the respective embodiments are merely examples, and additions, omissions, substitutions, and other changes to the configurations can be made as appropriate without departing from the gist of the present invention. The present disclosure is not limited by the embodiment, and is limited only by the claims.

First Embodiment

Figure 1:
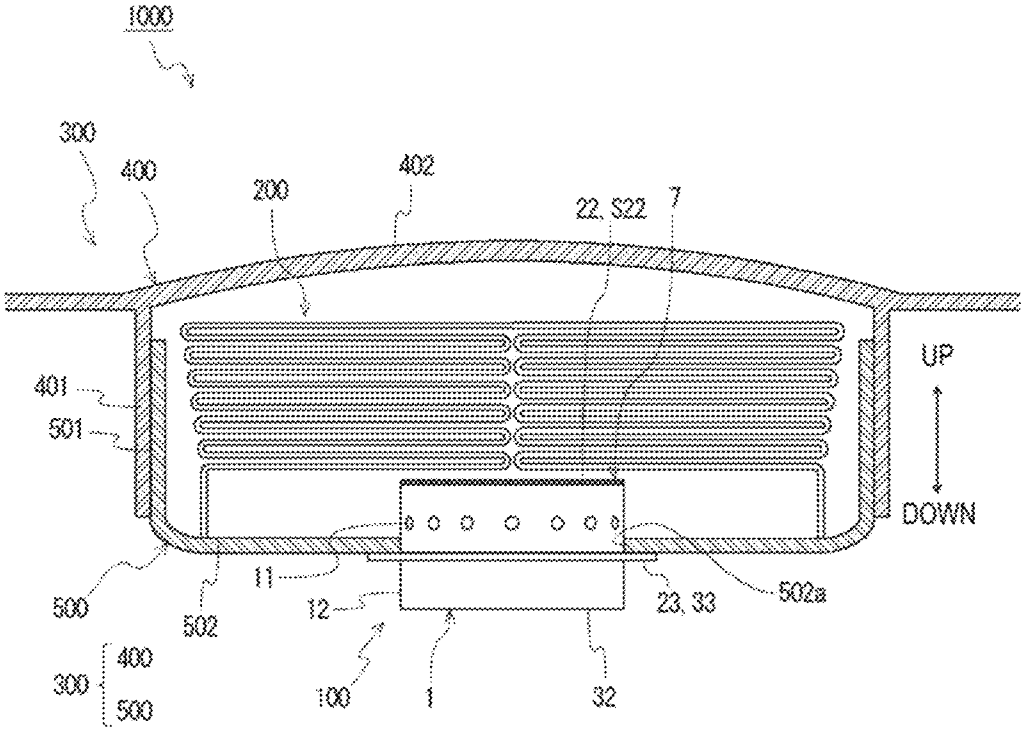
FIG. 1 is a cross-sectional view illustrating a state of an airbag module assembly including a gas generator according to a first embodiment before actuation.
Figure 2:
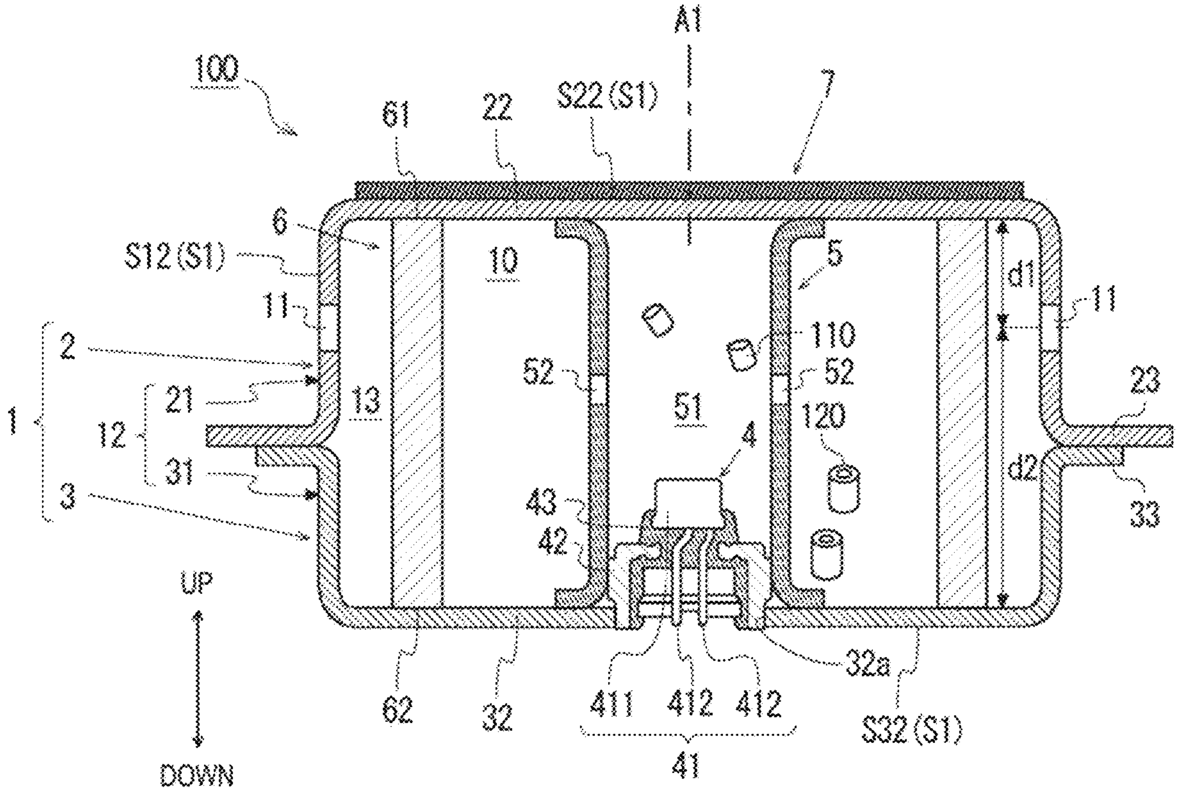
FIG. 2 is a cross-sectional view illustrating a state of the gas generator according to the first embodiment before actuation.

FIG. 1 is a cross-sectional view illustrating a state of an airbag module assembly 1000 including a gas generator (hereinafter, simply referred to as a gas generator) 100 for an airbag according to a first embodiment before actuation. FIG. 2 is a cross-sectional view illustrating a state of the gas generator 100 according to the first embodiment before actuation. FIGS. 1 and 2 illustrate a cross section along a center axis A1 of a housing denoted by reference sign 1. Here, a direction (axial direction) along the center axis A1 of the housing 1 is defined as a vertical direction of the gas generator 100, a side of an upper shell denoted by reference sign 2 in FIG. 2 (that is, an upper side in FIG. 2) is defined as an upper side of the gas generator 100, and a side of a lower shell denoted by reference sign 3 in FIG. 2 (that is, a lower side in FIG. 2) is defined as a lower side of the gas generator 100. Note that in the present specification, the actuation of an igniter included in an ignition device included in the gas generator may be expressed as "actuation of the ignition device", "actuation of the gas generator", or "actuation of the airbag module assembly" for convenience.

Overall Configuration

As illustrated in FIG. 1, the airbag module assembly 1000 includes the gas generator 100, an airbag 200, and a module case 300 accommodating the gas generator 100 and the airbag 200. The airbag module assembly 1000 is, for example, a frontal collision protection airbag device (so-called front airbag device) that is mounted on a vehicle and protects an occupant from an impact by expanding and inflating the airbag 200 at the time of a frontal collision of the vehicle. However, the airbag module assembly according to the present disclosure is not limited to the front airbag device. The airbag module assembly may be, for example, an airbag device for side collision protection (so-called side airbag device) that protects an occupant from an impact by expanding and inflating an airbag at the time of a side collision of a vehicle. Although the airbag module assembly 1000 according to the present embodiment is installed in a driver's seat (specifically, a steering wheel) of a vehicle as an example, the airbag module assembly according to the present disclosure may be installed in, for example, a dashboard of a passenger seat or other places.

The gas generator 100 is a supply source of gas for expanding the airbag 200. The gas generator 100 is configured to activate when, for example, a sensor (not illustrated) of the vehicle senses an impact, and to release gas to the exterior. The gas generator 100 will be described below in detail.

The airbag 200 is a bag body that expands when gas is supplied from the gas generator 100. The airbag 200 is made of polyamide, for example, and is accommodated in a folded state in the module case 300 before the gas generator 100 is actuated, as illustrated in FIG. 1.

The module case 300 is a box accommodating the gas generator 100 and the airbag 200. The module case 300 includes an airbag cover 400 and a back plate 500. The airbag cover 400 includes a tubular wall portion 401 having a tubular shape and forming a side surface of the module case 300, and a front surface portion 402 closing one end portion of the tube wall portion 401 and forming a front surface of the module case 300. The airbag cover 400 is formed to allow for combination with, for example, a steering wheel of a vehicle. The back plate 500 includes a tubular wall portion 501 having a tubular shape that is fixed to the tube wall portion 401 of the airbag cover 400 to form the side surface of the module case 300 together with the tube wall portion 401, and a back surface portion 502 closing one end portion of the tube wall portion 501 to form a back surface of the module case 300. The back surface portion 502 is formed with a mounting hole 502*a* used to mount the gas generator 100. The airbag 200 is connected to the gas generator 100 and is disposed in a folded state between the gas generator 100 and the front surface portion 402 of the module case 300.

The airbag module assembly 1000 is installed in a vehicle in such a manner that the front surface portion 402 of the airbag cover 400 faces an occupant (a driver in this example) to be protected by the airbag 200. When the gas generator 100 is actuated, the front surface portion 402 is ruptured by receiving a pressure due to expansion of the airbag 200, and as a result, the airbag 200 pops out of the module case 300 and inflates in front of the occupant. Thus, the occupant is protected from the impact.

Gas Generator

As illustrated in FIG. 2, the gas generator 100 according to the first embodiment is formed in a short tubular (disk-like) shape, and includes an ignition device 4, an inner tubular member 5, a filter 6, a first gas generating agent 110, a second gas generating agent 120, the metal housing 1 accommodating these components, and a temperature rise suppressing member 7 provided on an outer surface of the housing 1. The gas generator 100 is configured as a so-called single-type gas generator including only one ignition device. The gas generator 100 is configured as a so-called pyrotechnic gas generator using only a gas generating agent as a gas source. However, the gas generator according to the present disclosure is not limited to that described above. The gas generator according to the present disclosure may include a plurality of ignition devices, and may also be configured as a so-called hybrid gas generator using a gas generating agent and pressurized gas as a gas source.

The gas generator 100 is configured to combust the first gas generating agent 110 and the second gas generating agent 120 by actuating an igniter 41 included in the ignition device 4, and release the combustion gas, which is the resultant combustion product, from gas discharge ports 11 formed in the housing 1. Hereinafter, each configuration of the gas generator 100 will be described.

Housing

The housing 1 is formed in a short cylindrical shape in which both axial ends are closed by joining an upper shell 2 and a lower shell 3 made of metal, each being formed in a bottomed substantially cylindrical shape, in a state where their opening ends face each other. The housing 1 is made of metal. The metal material forming the housing 1 is not particularly limited, but examples thereof may include stainless steel. An internal space of the housing 1 forms a combustion chamber 10. The ignition device 4, the inner tubular member 5, the filter 6, the first gas generating agent 110, and the second gas generating agent 120 are arranged in the combustion chamber 10.

The upper shell 2 has an upper peripheral wall portion 21 having a tubular shape and a top plate portion 22 closing the upper end of the upper peripheral wall portion 21, thereby forming an internal space. An opening portion of the upper shell 2 is formed by a lower end portion of the upper peripheral wall portion 21. The lower end portion of the upper peripheral wall portion 21 is connected with a flange-shaped joining portion 23 extending radially outward. The lower shell 3 has a lower peripheral wall portion 31 having a tubular shape and a bottom plate portion 32 closing a lower end of the lower peripheral wall portion 31 and including the ignition device 4 fixed thereto, thereby forming an internal space. On the bottom plate portion 32, a mounting hole 32*a* for mounting the ignition device 4 is formed. An upper end portion of the lower peripheral wall portion 31 is connected with a flange-shaped joining portion 33 extending radially outward.

The upper shell 2 and the lower shell 3 can be formed by, for example, pressing a stainless steel. The joining portion 23 of the upper shell 2 and the joining portion 33 of the lower shell 3 are overlapped and joined by laser welding or the like to form the housing 1 having a short tubular shape with both axial ends closed. The upper peripheral wall portion 21 of the upper shell 2 and the lower peripheral wall portion 31 of the lower shell 3 form a tubular peripheral wall portion 12 connecting the top plate portion 22 and the bottom plate portion 32. That is, the housing 1 includes the tubular peripheral wall portion 12, the top plate portion 22 closing one end portion of the peripheral wall portion 12, and the bottom plate portion 32 closing the other end side of the peripheral wall portion 12 and having the ignition device 4 mounted thereto. The top plate portion 22, the bottom plate portion 32, and the peripheral wall portion 12 define the combustion chamber 10. Note that a center axis of the peripheral wall portion 12 constitutes the center axis A1 of the housing 1. The top plate portion 22 is an example of a “first closing portion” according to the present disclosure. The bottom plate portion 32 is an example of a “second closing portion” according to the present disclosure.

As illustrated in FIG. 2, on the peripheral wall portion 12 (more specifically, the upper peripheral wall portion 21 of the upper shell 2), a plurality of gas discharge ports 11 through which the combustion chamber 10 communicates with the external space of the housing 1 are formed side by side along a circumferential direction. The gas discharge ports 11 are closed by a seal tape (not illustrated) in a state before the ignition device 4 is actuated.

As illustrated in FIG. 2, the outer surface of the housing 1, more specifically, a surface on an opposite side to a surface defining the internal space (combustion chamber 10) of the housing 1 is denoted by reference numeral S1. The outer surface S1 is a surface facing the exterior of the gas generator 100. Of the outer surfaces S1, a surface of the peripheral wall portion 12 is referred to as an outer surface S12, a surface of the top plate portion 22 is referred to as an outer surface S22, and a surface of the bottom plate portion 32 is referred to as an outer surface S32.

As illustrated in FIG. 1, the gas generator 100 is mounted to the back plate 500 by fixing the flange portions (joining portions 23 and 33) of the housing 1 to the back surface portion 502 in a state where the gas discharge ports 11 and the top plate portion 22 of the housing 1 are inserted into the module case 300 from the mounting hole 502*a* of the module case 300. In the airbag module assembly 1000, the gas discharge ports 11 and the top plate portion 22 of the housing 1 are located inside the module case 300, and the bottom plate portion 32 is located outside of the module case 300. The gas generator 100 is disposed in such a manner that the top plate portion 22 of the housing 1 faces the airbag 200.

Here, as illustrated in FIG. 2, d1 denotes a distance between each of the gas discharge ports 11 and the top plate portion 22 in the axial direction of the housing 1 (the vertical direction in this example), and d2 denotes a distance between each of the gas discharge ports 11 and the bottom plate portion 32 in the axial direction of the housing 1. Here, the gas discharge port 11 is formed at a position where d1 is shorter than d2 in the axial direction of the housing 1. That is, the gas generator 100 according to the present embodiment is configured such that d1<d2 is satisfied. Therefore, the gas discharge port 11 is formed at a position closer to the top plate portion 22 than to the bottom plate portion 32. In the gas generator 100, to ensure easy gas supply to the airbag 200, the gas discharge port 11 is formed at a position closer to the top plate portion 22, beside which the airbag 200 is located, in the top plate portion 22 and the bottom plate portion 32.

Ignition Device

As illustrated in FIG. 2, the ignition device 4 includes the igniter 41, a collar 42, and a resin portion 43, and is mounted to the bottom plate portion 32 of the lower shell 3. The igniter 41 includes a metal cup body 411 containing an ignition agent, and a pair of conductive pins 412 and 412 for receiving supply of a current from the exterior. The igniter 41 is actuated by an ignition current supplied to the pair of conductive pins 412 and 412 to combust the ignition agent, and releases the resultant combustion product to the exterior of the cup body 411. The collar 42 is a metal member supporting the igniter 41. The collar 42 is formed in a tubular shape, and is fixed by welding or the like in a state of being press-fitted into the mounting hole 32*a* formed in the bottom plate portion 32. The resin portion 43 is a resin member that is interposed between the igniter 41 and the collar 42 to fix the igniter 41 to the collar 42. The resin portion 43 covers the lower portion of the igniter 41, and is engaged with the collar 42, thereby fixing the igniter 41 to the collar 42 in such a manner that at least a part of the cup body 411 is exposed from the resin portion 43. However, the entire cup body 411 may be overmolded by the resin portion 43. That is, the entire cup body 411 may be covered with the resin. In the resin portion 43, a connector insertion space into which a connector (not illustrated) for supplying power from an external power supply to the pair of conductive pins 412 and 412 can be inserted is formed inside the collar 42. The resin portion 43 covers and holds a part of the pair of conductive pins 412 and 412 in such a manner that lower ends of the pair of conductive pins 412 and 412 are exposed to the connector insertion space. Insulation between the pair of conductive pins 412 and 412 is maintained by the resin portion 43. Note that the fixing of the igniter 41 and the collar 42, and the relationship between the collar 42 and the bottom plate portion 32 are not limited to those in FIG. 2, and a known technique may be used.

Inner Tubular Member

The inner tubular member 5 is a tubular metal member extending from the bottom plate portion 32 toward the top plate portion 22 to surround the ignition device 4. The inner tubular member 5 is formed in a tubular shape with both end portions open. Within the combustion chamber 10, a fire transfer chamber 51 is formed between the inner tubular member 5 and the ignition device 4. The fire transfer chamber 51 is a space in which the first gas generating agent 110 is housed. The first gas generating agent 110 is combusted by actuation of the igniter 41 to generate combustion gas or the like. The inner tubular member 5 is provided with a plurality of communication holes 52 through which the internal space (i.e., the fire transfer chamber 51) communicates with the external space. The communication holes 52 are closed by a seal tape (not illustrated) in a state before the ignition device 4 is actuated.

Filter

The filter 6 is a tubular member made of a metal material, extending in the vertical direction, and having a plurality of holes. As illustrated in FIG. 2, the filter 6 is disposed in the combustion chamber 10 in such a manner that the filter 6 surrounds the second gas generating agent 120, and the gas discharge ports 11 are located radially outside the filter 6. That is, the filter 6 is disposed between the second gas generating agent 120 and the gas discharge ports 11 so as to surround the second gas generating agent 120. Of both axial end surfaces of the filter 6, one end surface (upper end surface denoted by reference numeral 61) is in contact with and supported by the top plate portion 22 of the upper shell 2, and the other end surface (lower end surface denoted by reference numeral 62) is in contact with and supported by the bottom plate portion 32 of the lower shell 3.

Since a plurality of holes are formed in the filter 6, the combustion gas of the second gas generating agent 120 disposed in the combustion chamber 10 can pass through the filter 6. The filter 6 functions as a coolant, and cools the combustion gas by removing heat from the combustion gas passing through the filter 6. In addition to the function of cooling the combustion gas described above, the filter 6 also has a function of filtering the combustion gas by trapping combustion residue contained in the combustion gas.

Gas Generating Agent

The first gas generating agent 110 is a so-called transfer charge which is combusted by the actuation of the ignition device 4 to ignite the second gas generating agent. In addition to a known black powder, a gas generating agent having high ignitability and a higher combustion temperature than the second gas generating agent 120 can be used as the first gas generating agent 110. The combustion temperature of the first gas generating agent 110 can be set in a range from 1700° C. to 3000° C. As the first gas generating agent 110, a known agent containing, for example, nitroguanidine (34 wt. %) and strontium nitrate (56 wt. %) can be used. Furthermore, the first gas generating agent 110 may have any of a variety of shapes, such as a granular shape, a pellet shape, a columnar shape, or a disk shape.

As the second gas generating agent 120, a gas generating agent having a relatively low combustion temperature can be used. The combustion temperature of the second gas generating agent 120 can be set in the range from 1000° C. to 1700° C. As the second gas generating agent 120, a known agent containing, for example, guanidine nitrate (41 wt. %), basic copper nitrate (49 wt. %), a binder, and an additive can be used. The second gas generating agent 120 may have any of a variety of shapes, such as a granular shape, a pellet shape, a columnar shape, or a disc shape.

Temperature Rise Suppressing Member

The temperature rise suppressing member 7 is a member that suppresses a further temperature rise of the housing 1 by absorbing heat of the housing 1 when the temperature of the housing 1 rises due to combustion of the gas generating agent. As illustrated in FIG. 2, the temperature rise suppressing member 7 is provided to cover a part of the outer surface S1 of the housing 1. In the present embodiment, the temperature rise suppressing member 7 is provided in contact with only a portion of the outer surface S1, which is the outer surface S22 of the top plate portion 22 facing the airbag 200 in the airbag module assembly 1000. The outer surface S22 of the top plate portion 22 is covered with the film-like temperature rise suppressing member 7. The temperature rise suppressing member 7 according to the present embodiment is in contact with the outer surface S1 (outer surface S22 in this example) of the housing 1 in such a manner that the heat of the housing 1 is easily transferred to the temperature rise suppressing member 7. In the housing 1, the temperature rise suppressing member 7 air-tightly contacts the outer surface S22 in the entire region of the top plate portion 22 that is a portion where the temperature rise suppressing member 7 is disposed. When the temperature of the housing 1 rises due to the combustion of the gas generating agent, the heat of the housing 1 is transferred to the temperature rise suppressing member 7 by heat conduction. Note that in the technology according to the present disclosure, a portion where the temperature rise suppressing member is provided in the housing is not limited. It may suffice that the temperature rise suppressing member is provided in contact with the outer surface of the housing to cover at least a part of the outer surface. For example, the temperature rise suppressing member may be provided to be in contact with the entire region of the outer surface of the housing.

The temperature rise suppressing member 7 includes an endothermic agent exhibiting an endothermic action, and a binder agent present together with the endothermic agent to impart flexibility to the temperature rise suppressing member 7, and is preferably formed by mixing the endothermic agent and the binder agent.

When the temperature of the housing 1 rises to a predetermined temperature due to combustion of the gas generating agent, the endothermic agent absorbs the heat of the housing 1 by undergoing a chemical change or a state change using the heat of the housing 1. Here, the predetermined temperature is set to a temperature higher than the temperature of the housing 1 before actuation of the gas generator 100 and lower than the maximum temperature of the housing 1 assumed when the gas generating agent is combusted in a case where the temperature rise suppressing member 7 is not provided in the housing 1. The predetermined temperature is not particularly limited. However, the predetermined temperature is set to less than 300° C., for example, in a case where the maximum temperature when the temperature of the housing 1 rises due to combustion of the gas generating agent in a state where the temperature rise suppressing member 7 is not provided is 300° C. That is, the endothermic agent undergoes a chemical change or a state change accompanied by an endothermic action, at a temperature lower than the maximum temperature of the housing 1 assumed when the gas generating agent is combusted in a case where the temperature rise suppressing member 7 is not provided in the housing 1. This suppresses the temperature of the housing 1 from rising to the maximum temperature. In this case, the chemical change of the endothermic agent caused by the heat of the housing 1 means a change to a different compound. The state change of the endothermic agent caused by the heat of the housing 1 means a physical change in form. A type of chemical change or state change undergone by the endothermic agent due to heat is not particularly limited. Examples of the chemical change include thermal decomposition of a compound. Examples of the state change include sublimation from a solid to a gas. That is, the endothermic agent may be thermally decomposed by the heat of the housing 1 to absorb the heat of the housing 1, or may be sublimated from a solid to a gas by the heat of the housing 1 to absorb the heat of the housing 1. The endothermic agent cools the housing 1 by depriving the housing 1 of thermal energy required for such a state change or chemical change.

As the endothermic agent, a non-combustible agent can be used. The endothermic agent may include, for example, at least one type selected from the group consisting of a fatty acid polycarbonate and a magnesium carbonate as a compound thermally decomposed at a temperature lower than 300° C. The endothermic agent may include at least one type selected from the group consisting of p-dichlorobenzene, DL-camphor, naphthalene, fumaric acid, and terephthalic acid as a substance exhibiting an endothermic property by sublimation, for example. The endothermic agent may include a combination of the above compounds. However, the material of the endothermic agent according to the present disclosure is not limited to the materials described above.

The binder agent is used with the endothermic agent to impart flexibility to the temperature rise suppressing member 7. It is only required that the binder agent is present together with the endothermic agent in the temperature rise suppressing member 7. The binder agent is located at any suitable location, but is preferably mixed with the endothermic agent. When the flexibility is imparted to the temperature rise suppressing member 7 by the binder agent, the steady contact of the temperature rise suppressing member 7 to the housing 1 is improved, and the temperature rise suppressing member 7 is less likely to peel off from the housing 1. In this sense, the endothermic agent and the binder agent may not be mixed in the temperature rise suppressing member 7. For example, the binder agent may be disposed separately from the endothermic agent without being mixed with the endothermic agent, and may be interposed in a layer form between the housing and the endothermic agent. However, from the viewpoint of improving the flexibility of the temperature rise suppressing member 7, it is more preferable that the binder agent is mixed with the endothermic agent so that these agents are integrated. When the flexibility is imparted to the temperature rise suppressing member 7, the temperature rise suppressing member 7 attached to the housing 1 is suppressed from being damaged (for example, cracked) due to deformation of the housing 1 or an external impact.

It is preferable to use a binder agent that does not generate an unnecessary gas (carbon monoxide, nitrogen oxide, or the like) even if the binder agent is decomposed by heat during actuation of the gas generator 100. In this respect, the binder agent preferably includes, for example, a compound having a hydroxyl group or a carbonyl group as a functional group in the molecule, and is more preferably used by being mixed with the endothermic agent. By using a compound having a composition containing these functional groups as the binder agent, the flexibility of the temperature rise suppressing member 7 is suitably improved. Further, for example, even if a gas is generated from the binder agent heated by heat transfer from the housing 1, the gas can be made harmless.

The binder agent may include at least one type selected from the group consisting of, for example, butadiene rubber, silicon rubber, polyvinyl alcohol, ethylene vinyl alcohol, styrene butadiene rubber, natural rubber, chloroprene rubber, isoprene rubber, acrylic rubber, alkyl acetalized polyvinyl alcohol, and polycarboxylic acid copolymer. The binder agent may include a combination of the above compounds. For example, alkyl acetalized polyvinyl alcohol or a polycarboxylic acid copolymer is used as a binder agent in a state of being mixed with an endothermic agent, so that even if the temperature rise suppressing member 7 applied to the housing 1 is bent, cracks are less likely to be generated, and the temperature rise suppressing member 7 is less likely to peel off from the housing 1. However, the material of the binder agent according to the present disclosure is not limited to the materials described above.

Here, it is preferable that the content ratio of the endothermic agent to the temperature rise suppressing member 7 is 70% or greater and 95% or less, and the content ratio of the binder agent is 5% or greater and 30% or less. Thus, it is possible to suitably impart flexibility to the temperature rise suppressing member 7 while achieving suppression of the temperature rise of the housing 1 by the heat absorbing action of the endothermic agent. For example, in a case where the temperature rise suppressing member 7 is a mixed agent composed only of the endothermic agent and the binder agent, the ratio between the endothermic agent and the binder agent can be selected from the range from 7:3 to 95:5. However, the content ratio of the endothermic agent and the content ratio of the binder agent in the temperature rise suppressing member according to the present disclosure are not limited to the ranges described above. The temperature rise suppressing member may include a material other than the endothermic agent and the binder agent described above.

The temperature rise suppressing member 7 can be provided as a coating film on the outer surface S1 of the housing 1 by applying the temperature rise suppressing member 7 in a state of being dissolved in a solvent to the outer surface S1 of the housing 1 and drying the temperature rise suppressing member 7.

Operation

An operation of the gas generator 100 and the airbag module assembly 1000 according to the first embodiment will be described below with reference to FIGS. 1 and 2. When a sensor (not illustrated) of an automobile senses an impact, an ignition current is supplied to the pair of conductive pins 412 and 412, and the igniter 41 is actuated. Then, the ignition agent contained in the cup body 411 of the igniter 41 combusts, and flame, high-temperature gas, and the like, which are the resultant combustion products, are released to the exterior of the cup body 411. Thus, the first gas generating agent 110 accommodated in the fire transfer chamber 51 combusts, and combustion gas is generated. The combustion gas of the first gas generating agent 110 breaks the seal tape closing the communication holes 52 and is released from the communication holes 52 to the exterior of the fire transfer chamber 51. Then, the combustion gas of the first gas generating agent 110 comes into contact with the second gas generating agent 120, and the second gas generating agent 120 is ignited. The combustion of the second gas generating agent 120 generates high-temperature and high-pressure combustion gas in the combustion chamber 10. When this combustion gas passes through the filter 6, the combustion gas is cooled, and combustion residue is trapped. The combustion gas of the second gas generating agent 120 cooled and filtered by the filter 6 passes through a gap 13, breaks the seal tape closing the gas discharge ports 11, and is released from the gas discharge ports 11 to the exterior of the gas generator 100. The combustion gas of the second gas generating agent 120 is released to the exterior of the gas generator 100, and then flows into the airbag 200 in the module case 300. When the airbag 200 is expanded by the supply of the gas, the front surface portion 402 of the module case 300 is ruptured by the expansion pressure, and the airbag 200 pops out of the module case 300 and inflates in front of the occupant. As a result, a cushion is formed between the occupant and a rigid structure, and the occupant is protected from the impact.

Temperature Rise Suppression in Housing

When the gas generator 100 is actuated, heat generated by combustion of the gas generating agent is transferred to the housing 1, and then transferred to the temperature rise suppressing member 7 in contact with the housing 1 by heat conduction. Therefore, as the temperature of the housing 1 rises, the temperature of the temperature rise suppressing member 7 also rises. When the temperature of the temperature rise suppressing member 7 rises to a predetermined temperature, the endothermic agent contained in the temperature rise suppressing member 7 starts a state change or a chemical change. At this time, the endothermic agent deprives the housing 1 of thermal energy and uses the thermal energy for a chemical change or a state change. As a result, the housing 1 is cooled by the heat absorbing action of the endothermic agent, and the temperature rise of the housing 1 is suppressed. Heat is absorbed from a contact portion of the housing 1 with the temperature rise suppressing member 7, and thus, the temperature rise is suppressed at the top plate portion 22 in contact with the temperature rise suppressing member 7.

Here, as illustrated in FIG. 1, in the airbag module assembly 1000, the gas generator 100 is disposed in such a manner that the top plate portion 22 and the airbag 200 in a folded state face each other. Therefore, the airbag 200 having contracted after inflation is in a state of easily coming into contact with the top plate portion 22 of the housing 1. When the temperature of the top plate portion 22 of the housing 1 becomes excessively high after the actuation of the gas generator 100, the airbag 200 having contracted after inflation comes into contact with the top plate portion 22 of the housing 1, and as a result, the airbag 200 may melt and generate unwanted gas or odor. As illustrated in FIG. 2, in the gas generator 100 according to the present embodiment, the upper end surface 61 of the metal filter 6 to which high-temperature combustion residue adheres is in contact with the top plate portion 22 of the housing 1. Furthermore, in the gas generator 100 according to the present embodiment, the upper end portion of the inner tubular member 5 made of metal and filled with the first gas generating agent 110 is in contact with the top plate portion 22 of the housing 1. Therefore, a large amount of heat is conducted to the top plate portion 22 via the filter 6 and the inner tubular member 5. In particular, a major portion of the amount of heat is constituted by combustion residue generated from the first gas generating agent 110 and the second gas generating agent 120, and the combustion residue adheres to the inner surface of the housing 1 and the filter 6, causing a temperature rise of the housing 1. That is, the temperature of the housing 1 gradually increases after the actuation of the gas generator 100, and thus, the temperature of the housing 1 increases to the maximum after the airbag 200 performs the function (after the airbag 200 contracts). Therefore, if the gas generator 100, not including the temperature rise suppressing member 7, is actuated, the top plate portion 22 is likely to have a high temperature. If the inflated bag comes into contact with the top plate portion 22 in such a high-temperature state, the bag melts, which leads to generation of odor or unwanted gas.

On the other hand, in the gas generator 100 according to the present embodiment, the temperature rise suppressing member 7 is provided in contact with the outer surface S22 of the top plate portion 22 of the housing 1. Therefore, as described above, the temperature rise is suppressed at the top plate portion 22 which is a contact portion of the housing 1 with the temperature rise suppressing member 7. Thus, in the airbag module assembly 1000, the temperature of the top plate portion 22 facing the airbag 200 is prevented from becoming excessively high. As a result, melting of the airbag 200 due to contact of the airbag 200 having contracted after inflation with the top plate portion 22 of the housing 1 is suppressed. As a consequence, generation of odor and unwanted gas is suppressed. The melting of the airbag 200 after actuation of the gas generator 100 is suppressed, and as a result, adhesion of the airbag 200 to the housing 1 of the gas generator 100 is suppressed. As a result, it is easy to discard the gas generator 100 after actuation. Furthermore, according to the gas generator 100, the temperature rise of the housing 1 is suppressed, and thus, an occupant is prevented from being burned when coming into contact with the housing 1.

For example, when the airbag 200 made of polyamide is used, the airbag 200 melts at about 350° C., but the gas generator 100 can prevent the airbag 200 from melting by controlling the temperature of the housing 1 after actuation of the gas generator 100 to, for example, 250° C. or less by the temperature rise suppressing member 7.

When the flexibility is imparted to the temperature rise suppressing member 7 by the binder agent, the steady contact of the temperature rise suppressing member 7 to the housing 1 is improved, and thus, the temperature rise suppressing member 7 is less likely to peel off from the housing 1. Therefore, the temperature rise suppressing member 7 is suppressed from peeling off due to vibration received during traveling of the vehicle or during transportation of the gas generator 100, and the temperature rise suppressing member 7 is suppressed from peeling off due to a temperature difference in the housing 1 before and after the actuation of the gas generator 100. Even when the housing 1 is deformed by the pressure of the combustion gas, the temperature rise suppressing member 7 is deformed following the deformation of the housing 1 due to its flexibility, and thus, the temperature rise suppressing member 7 is suppressed from being damaged. The flexibility is imparted to the temperature rise suppressing member 7, and thus, the temperature rise suppressing member 7 is also suppressed from being damaged by an external impact. As a result, the temperature rise of the housing 1 after the actuation of the gas generator 100 can be efficiently suppressed. By enhancing the steady contact performance of the temperature rise suppressing member 7 to the housing 1, the amount of the temperature rise suppressing member 7 can be reduced. As a result, a space-saving gas generator 100 can be realized. In this regard, the temperature rise suppressing member 7 may be formed in separate layers of binder agent and endothermic agent, so that the temperature rise suppressing member 7 can be disposed in such a manner the binder-agent side is in contact with the housing 1, and further a layer of binder agent is formed on top of the temperature rise suppressing member 7 (on the endothermic agent); however, to impart uniform flexibility to the temperature rise suppressing member 7 in its entirety, it is preferable that the endothermic agent and the binder agent are mixed and disposed on the outer surface S22 of the top plate portion 22 of the housing 1.

Actions and Effects

As described above, the gas generator 100 according to the first embodiment includes the gas generating agents 110 and 120 that generate gas by combustion, the housing 1 made of metal, and accommodating the gas generating agents therein, and the ignition device 4 that ignites the gas generating agent by actuation. On the housing 1, each of the gas discharge ports 11 is formed, through which the gas generated by combustion of the gas generating agent is emitted to the exterior of the housing 1. The gas generator 100 further includes the temperature rise suppressing member 7 provided in contact with the outer surface S1 to cover at least a part of the outer surface S1 of the housing 1 (in this example, the outer surface S22). The temperature rise suppressing member 7 includes the endothermic agent and the binder agent. When the temperature of the housing 1 rises due to the combustion of the gas generating agent, the endothermic agent absorbs the heat of the housing 1 by undergoing a chemical change or a state change by the heat of the housing 1. The binder agent is present together with the endothermic agent such that the temperature rise suppressing member 7 has flexibility, and is preferably used in a state of being integrated with the endothermic agent by being mixed with the endothermic agent.

According to this gas generator 100, when the temperature of the housing 1 rises due to the combustion of the gas generating agent, the endothermic agent contained in the temperature rise suppressing member 7 actively deprives the housing 1 of thermal energy due to a state change or a chemical change. As a result, the temperature rise of the housing 1 after the actuation of the gas generator 100 can be suitably suppressed. Furthermore, when the flexibility is imparted to the temperature rise suppressing member 7 by the binder agent, the temperature rise suppressing member 7 can be provided in the housing 1 with improved steady contact. As a result, the temperature rise suppressing member 7 is suppressed from peeling off from the housing 1 for a long period of time, and the temperature rise of the housing 1 can be suppressed more efficiently. According to this gas generator 100, it is possible to reduce a thermal influence on components (in this example, the airbag 200) disposed around the housing 1 after the actuation of the gas generator 100. This is suitable for a case where components (resin components) susceptible to heat are disposed around the housing 1.

Further, in the gas generator 100 according to the present embodiment, the housing 1 includes the peripheral wall portion 12 having a tubular shape, and having the gas discharge port 11 formed therein, the top plate portion 22 closing one end portion of the peripheral wall portion 12, and the bottom plate portion 32 closing the other end portion of the peripheral wall portion 12, in which the gas discharge port 11 is formed at a position where the distance d1 between the gas discharge port 11 and the top plate portion 22 is shorter than the distance between the gas discharge port 11 and the bottom plate portion 32 in the axial direction of the housing 1. In the gas generator 100, the temperature rise suppressing member 7 is provided on the outer surface S22 of the top plate portion 22 closer to the gas discharge port 11 than to the bottom plate portion 32 in the housing 1. According to this configuration, when the heat absorption by the temperature rise suppressing member 7 acts on the top plate portion 22, it is possible to efficiently suppress a temperature rise in the top plate portion 22 of the housing 1. As a result, it is possible to further reduce the thermal influence on the component (the airbag 200 in this example) disposed to face the top plate portion 22 of the housing 1. In this regard, the airbag module assembly 1000 according to the present embodiment includes the gas generator 100 and the airbag 200 disposed in a folded state, and configured to be expanded and inflated by the gas emitted from the gas discharge port 11, in which the gas generator 100 is disposed in such a manner that the top plate portion 22 of the housing 1 and the airbag 200 in a folded state face each other. Therefore, according to the gas generator 100 of the present embodiment, it is possible to reduce the thermal influence on the airbag 200 which is a component disposed to face the top plate portion 22 of the housing 1.

Note that in the technology according to the present disclosure, the temperature rise suppressing member is not limited to being provided in a particular portion in the housing; however, the temperature rise suppressing member is preferably provided at a portion to which heat caused by combustion of the gas generating agent is likely to be transferred, or at a portion close to components disposed around the temperature rise suppressing member when the components need to avoid the thermal influence. For example, it is preferable that the temperature rise suppressing member is provided in contact with an outer surface of a portion of the housing abutting on the filter to which the high-temperature combustion residue adheres (at least one of the first closing portion or the second closing portion), or an outer surface of a portion of the housing adjacent to the combustion chamber in which the gas generating agent combusts (that is, a portion defining the combustion chamber).

MODIFIED EXAMPLES

A gas generator and an airbag module assembly according to a modified example of the first embodiment will be described below. In the description of the modified example, differences from the gas generator 100 described with reference to FIGS. 1 and 2 will be mainly described, and detailed descriptions of points similar to those of the gas generator 100 will be omitted.

First Modified Example

Figure 3:
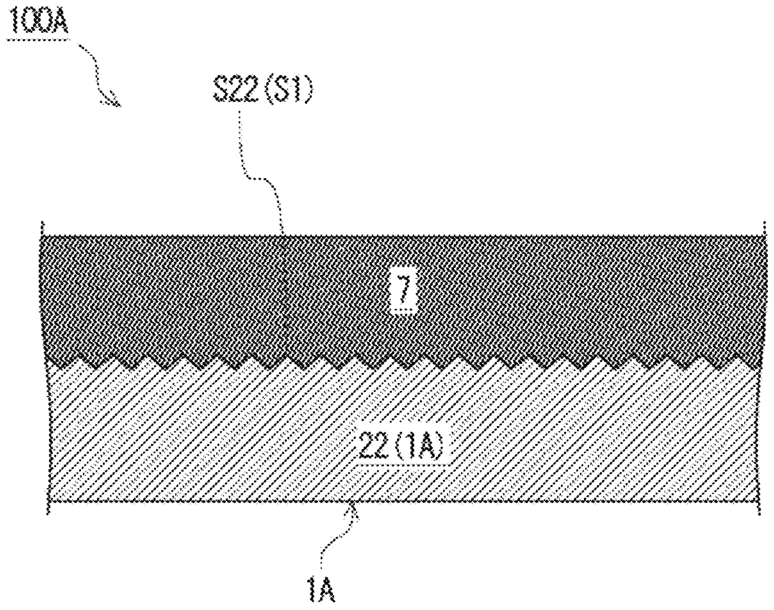
FIG. 3 is a partially enlarged view of the gas generator according to a first modified example of the first embodiment.

FIG. 3 is a partially enlarged view of a gas generator 100A according to a first modified example of the first embodiment. FIG. 3 illustrates a vicinity of the top plate portion 22 which is a portion of a housing 1A according to the first modified example, in which the temperature rise suppressing member 7 is provided. As illustrated in FIG. 3, the gas generator 100A according to the first modified example is different from the above-described gas generator 100 in that the outer surface S22, which is a contact portion with the temperature rise suppressing member 7 in the outer surface S1 of the housing 1A, is formed to have recesses and protrusions. The recesses and protrusions are formed by, for example, roughening the surface of the housing 1. In the outer surface S1 of the housing 1A, the entire outer surface S22 may have recesses and protrusions, or a part of the outer surface S22 may have recesses and protrusions.

In the gas generator 100A according to the first modified example, the outer surface S22 of the outer surface S1 of the housing 1A, which is a contact portion with the temperature rise suppressing member 7, is formed to have recesses and protrusions. Thus, as compared with a case where the outer surface S22 is a flat surface, it is possible to increase a contact area between the temperature rise suppressing member 7 and the outer surface S22. Thus, the efficiency in heat transfer from the housing 1A to the temperature rise suppressing member 7 is improved. As a result, the heat absorption by the temperature rise suppressing member 7 is promoted, and the temperature rise of the housing 1A can be suppressed more efficiently.

Second Modified Example

Figure 4:
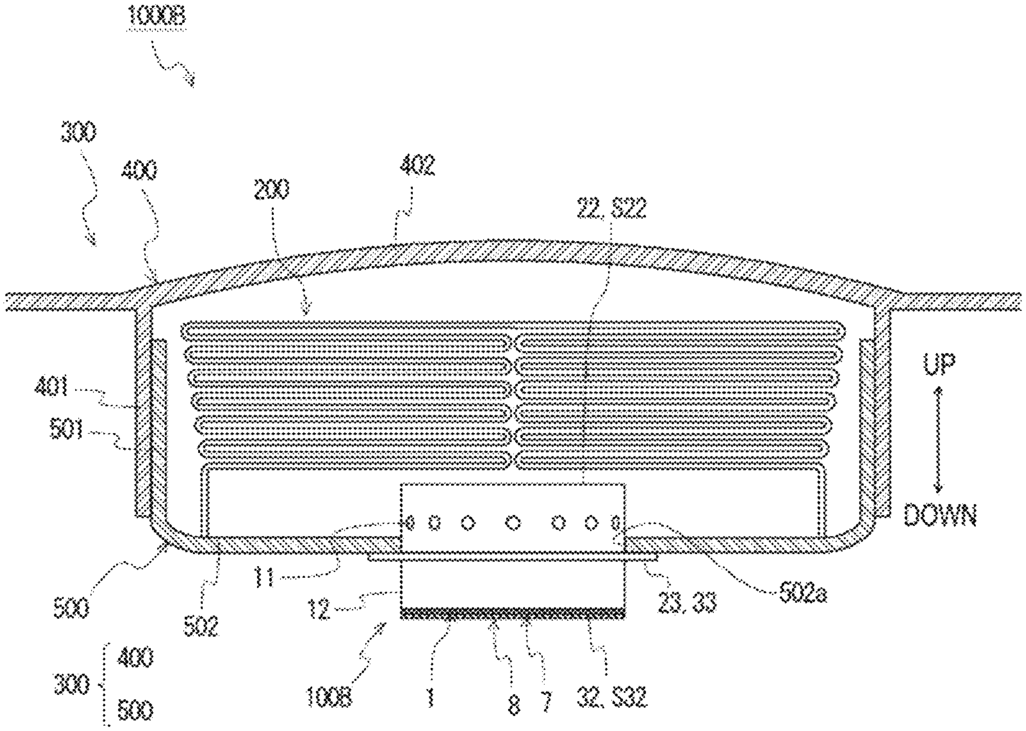
FIG. 4 is a cross-sectional view illustrating a state of an airbag module assembly including a gas generator according to a second modified example of the first embodiment before actuation.
Figure 5:
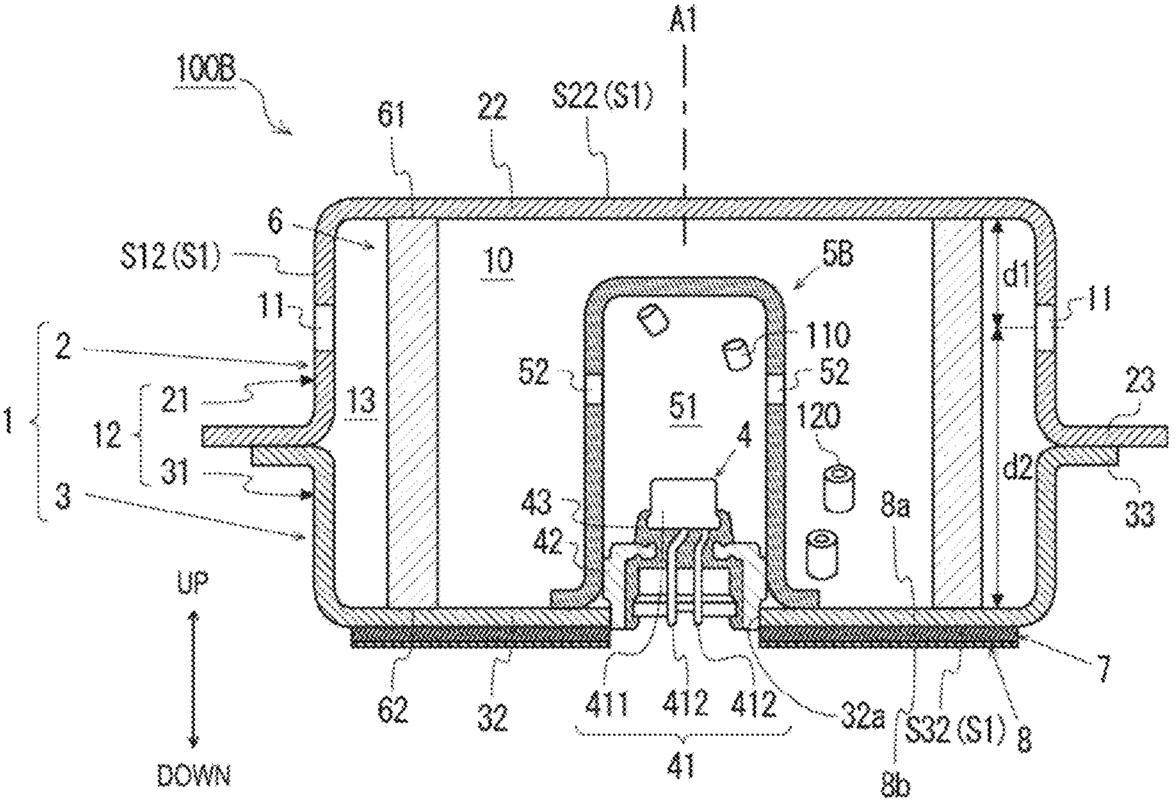
FIG. 5 is a cross-sectional view illustrating a state of the gas generator according to the second modified example of the first embodiment before actuation.

FIG. 4 is a cross-sectional view illustrating a state of an airbag module assembly 1000B including a gas generator 100B according to a second modified example of the first embodiment before actuation. FIG. 5 is a cross-sectional view illustrating a state of the gas generator 100B according to the second modified example of the first embodiment before actuation. FIGS. 4 and 5 illustrate a cross section along the center axis A1 of the housing 1.

As illustrated in FIG. 5, an inner tubular member 5B according to the second modified example is formed in a bottomed tubular shape with one end (upper end) closed and the other end (lower end) open, and has a lower end welded with the collar 42 of the ignition device 4 to be mounted to the bottom plate portion 32.

In the second modified example, a structure for suppressing a temperature rise on the bottom plate portion 32 side of the housing 1 is illustrated. To be more specific, in the gas generator 100B according to the second modified example, the temperature rise suppressing member 7 is provided in contact only with the outer surface S32 of the bottom plate portion 32 of the housing 1. The entire region of the outer surface S32 of the bottom plate portion 32 except for the mounting hole 32*a* is covered with the film-like temperature rise suppressing member 7. More specifically, the temperature rise suppressing member 7 air-tightly contacts the outer surface S32 in the entire region of the bottom plate portion 32 which is a portion of the housing 1 where the temperature rise suppressing member 7 is disposed.

The gas generator 100B according to the second modified example includes a label sheet 8. The label sheet 8 is a sheet-like member with predetermined information indicated thereon, and is attached to the temperature rise suppressing member 7 in such a manner that the temperature rise suppressing member 7 is interposed between the label sheet 8 and the housing 1. The label sheet 8 is attached to the temperature rise suppressing member 7 in a state in which one surface (attachment surface 8*a*) of both surfaces of the label sheet 8 faces and contacts the temperature rise suppressing member 7. The predetermined information is indicated on the other surface (indication surface 8*b*) of the label sheet 8.

On the indication surface 8*b* of the label sheet 8, for example, information relating to the gas generator 100B is indicated as the predetermined information. Examples of the information relating to the gas generator 100B include a precaution for handling, manufacturer information, a model number, and a bar code for management. However, the information indicated on the label sheet according to the present disclosure is not limited to those described above.

A material of the label sheet 8 is not particularly limited. For example, a heat-resistant resin material such as a polyester film can be used. The label sheet 8 can be affixed to the bottom plate portion 32 by using, for example, adhesion of the temperature rise suppressing member 7. That is, the temperature rise suppressing member 7 can be interposed between the housing 1 and the label sheet 8 as a bonding adhesive (bonding layer). Note that the bonding adhesive may be separately applied to the attachment surface 8*a*, and the label sheet 8 may be affixed to the temperature rise suppressing member 7. A method of indicating the predetermined information on the indication surface 8*b* of the label sheet 8 is not particularly limited. For example, the predetermined information can be written on the indication surface 8*b* by printing or marking.

As illustrated in FIG. 4, in the airbag module assembly 1000B, the bottom plate portion 32 of the housing 1 is exposed to the exterior of the module case 300. In the gas generator 100B according to the second modified example, the label sheet 8 is attached to the outer surface S32 of the bottom plate portion 32 of the housing 1 via the temperature rise suppressing member 7 to be visible from the exterior of the module when the label sheet 8 is incorporated into the airbag module assembly 1000B. However, the position where the label sheet 8 is attached is not limited to the bottom plate portion 32.

In the gas generator 100B according to the second modified example, by interposing the temperature rise suppressing member 7 between the label sheet 8 and the bottom plate portion 32 of the housing 1, it is possible to suppress the temperature rise of the bottom plate portion 32 after the actuation of the gas generator 100B. Thus, since the temperature rise of the bottom plate portion 32 to which the label sheet 8 is attached is suppressed via the temperature rise suppressing member 7, the temperature rise of the label sheet 8 after the actuation of the gas generator 100B can also be suppressed. As a result, it is possible to prevent the visibility of contents indicated on the label sheet 8 from being degraded due to discoloration, denaturation, combustion, or the like of the label sheet 8 caused by a high temperature after the actuation of the gas generator 100B. That is, it is possible to reduce the thermal influence on the label sheet 8 after the actuation of the gas generator 100B.

Second Embodiment

A gas generator and an airbag module assembly according to a second embodiment will be described below. In the description of the second embodiment, differences from the gas generator 100 according to the first embodiment described with reference to FIGS. 1 and 2 will be mainly described, and detailed descriptions about points similar to those of the gas generator 100 will be omitted.

Figure 6:
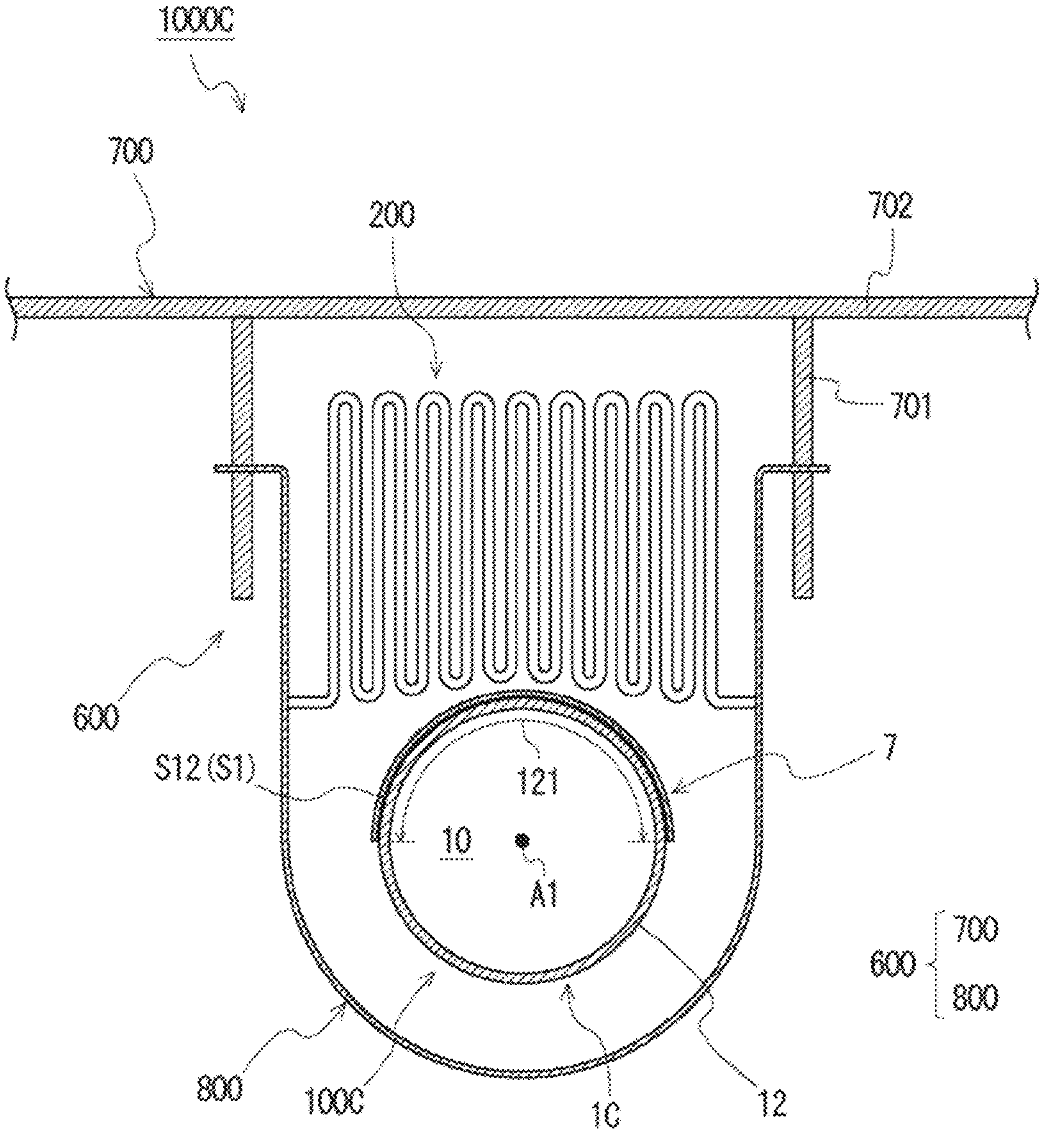
FIG. 6 is a cross-sectional view illustrating a state of the airbag module assembly including a gas generator according to a second embodiment before actuation.
Figure 7:
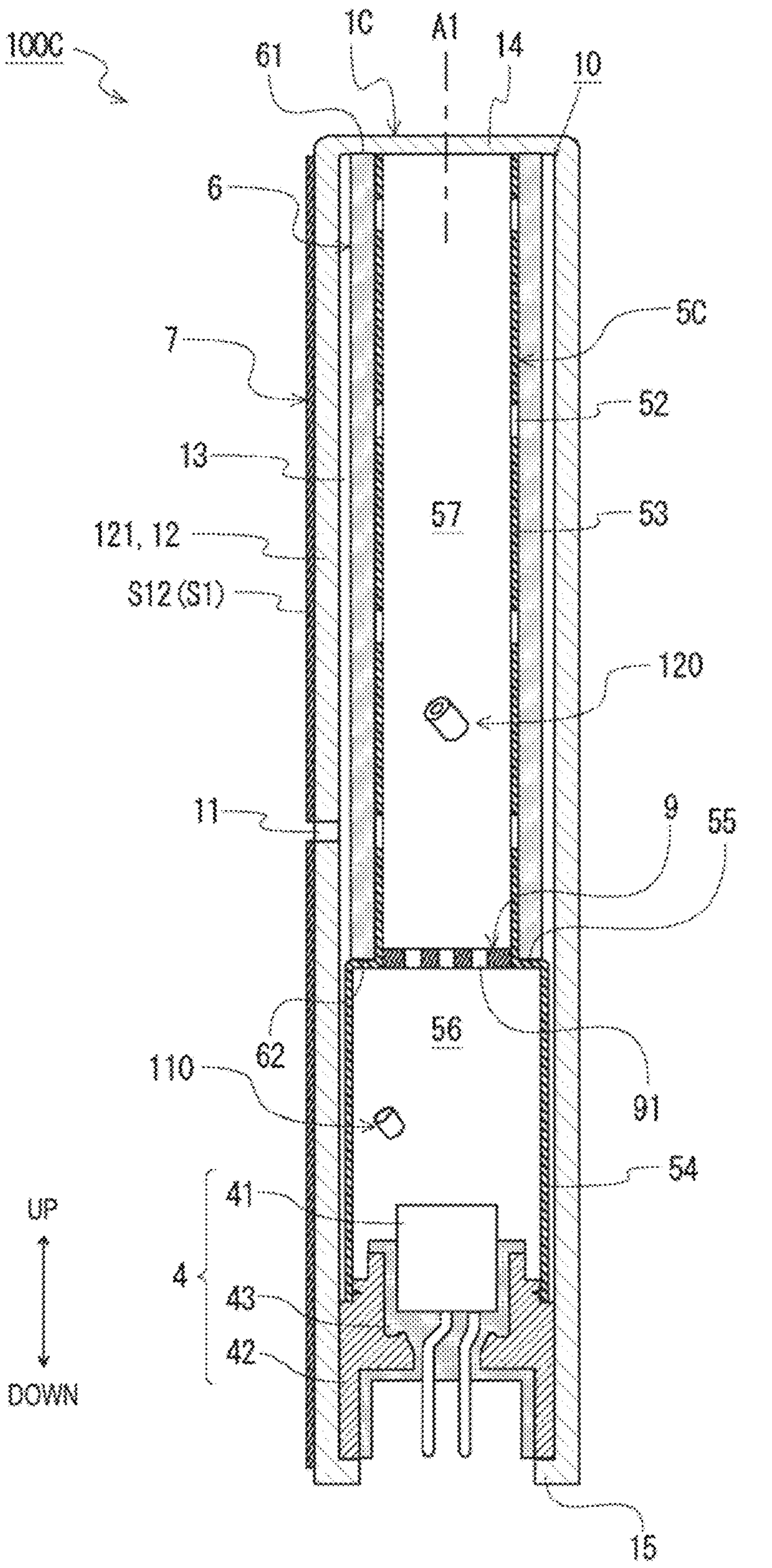
FIG. 7 is a cross-sectional view illustrating a state of the gas generator according to the second embodiment before actuation.

FIG. 6 is a cross-sectional view illustrating a state of an airbag module assembly 1000C including a gas generator 100C according to the second embodiment before actuation. FIG. 6 illustrates a cross section perpendicular to the center axis A1 of a housing 1C. Note that in FIG. 6, an inner tubular member 5C of the gas generator 100C, the filter 6, the gas generating agent, and the like are not illustrated. FIG. 7 is a cross-sectional view illustrating a state of the gas generator 100C for an airbag according to the second embodiment before actuation. FIG. 7 illustrates a cross section along the center axis A1 of the housing 1C.

As illustrated in FIG. 6, the airbag module assembly 1000C includes the gas generator 100C, the airbag 200, and a module case 600 accommodating the gas generator 100C and the airbag 200. The airbag module assembly 1000C is, for example, a front airbag device installed in a vehicle passenger seat (more specifically, a dashboard of the passenger seat). However, the airbag module assembly 1000C may be applied to a front airbag device for a driver's seat or a side airbag device.

The module case 600 is a box accommodating the gas generator 100C and the airbag 200. The module case 600 includes an airbag cover 700 and a retainer 800. The airbag cover 700 includes a rectangular frame-shaped side wall portion 701 forming a side surface of the module case 600, and a front surface portion 702 closing one end portion of the side wall portion 701 and forming a front surface of the module case 600. The airbag cover 700 is installed in such a manner that the front portion 702 constitutes, for example, a part of a dashboard of a vehicle. The retainer 800 is fixed to a structure (not illustrated) in the vehicle, and is engaged with the side wall portion 701 of the airbag cover 700 to form an accommodation space for the gas generator 100C and the airbag 200 together with the airbag cover 700. The gas generator 100C is disposed in the module case 600 in such a manner that the peripheral wall portion 12 of the housing 1C faces the front surface portion 702 side. Between the peripheral wall portion 12 of the gas generator 100 and the front surface portion 702 of the module case 600, the airbag 200 in a folded state is disposed.

The airbag module assembly 1000C is installed in the vehicle in such a manner that the front surface portion 702 of the airbag cover 700 faces an occupant (an occupant on the front passenger seat in this example) to be protected by the airbag 200. When the gas generator 100C is actuated, the front surface portion 702 is ruptured by receiving a pressure due to expansion of the airbag 200, and the airbag 200 pops out of the module case 600 and inflates in front of the occupant. Thus, the occupant is protected from the impact.

As illustrated in FIG. 7, the gas generator 100C according to the second embodiment is formed in a long tubular (cylindrical) shape, and includes the ignition device 4, the inner tubular member 5C, the filter 6, the first gas generating agent 110, the second gas generating agent 120, a housing 1C made of metal and accommodating these components, the temperature rise suppressing member 7 provided on the outer surface S1 of the housing 1C, and a partition wall member 9. The gas generator 100C according to the present embodiment is configured as a pyrotechnic gas generator using only a gas generating agent as a gas source, but may be configured as a hybrid gas generator using a gas generating agent and pressurized gas as gas sources.

As illustrated in FIG. 7, the housing 1C according to the second embodiment is formed in a bottomed tubular shape with one end portion (upper end portion) closed and the other end portion (lower end portion) open. The housing 1C includes the peripheral wall portion 12 having a tubular shape, the top plate portion 14 closing one end portion (upper end portion) of the peripheral wall portion 12, and a fixing portion 15 extending radially inward from the other end portion (lower end portion) of the peripheral wall portion 12. In the gas generator 100C according to the second embodiment, the ignition device 4 is fixed to the lower end portion of the peripheral wall portion 12 by crimping the fixing portion 15 in a state where the ignition device 4 is fitted into the lower end portion of the peripheral wall portion 12. The inner tubular member 5C is formed in a tubular shape with the both end portions open, and is mounted to the housing 1C by fitting (press-fitting) the collar 42 of the ignition device 4 into the lower end portion in a state in which the upper end portion abuts on the top plate portion 14 of the housing 1C. The inner tubular member 5C includes a first outer diameter portion 53 including an upper end portion thereof, and a second outer diameter portion 54 including a lower end portion thereof. The first outer diameter portion 53 has a smaller outer diameter than the second outer diameter portion 54. The first outer diameter portion 53 and the second outer diameter portion 54 are connected to each other by a step portion 55 extending in the radial direction. The communication holes 52 are formed in the first outer diameter portion 53. In the filter 6, the upper end surface 61 abuts on and is supported by the top plate portion 14, and the lower end surface 62 abuts on and is supported by the step portion 55. The partition wall member 9 is a member defining the internal space of the inner tubular member 5C in the axial direction. The internal space of the inner tubular member 5C is divided by the partition wall member 9 into a first combustion chamber 56 surrounded by the second outer diameter portion 54, and a second combustion chamber 57 surrounded by the first outer diameter portion 53. A plurality of through holes 91 are formed in the partition wall member 9 to allow the first combustion chamber 56 and the second combustion chamber 57 to communicate with each other. The first gas generating agent 110 is disposed in the first combustion chamber 56. The second gas generating agent 120 is disposed in the second combustion chamber 57.

As illustrated in FIG. 6, in the airbag module assembly 1000C, the gas generator 100C is disposed in such a manner that the peripheral wall portion 12 of the housing 1C faces the airbag 200 in a folded state. More specifically, a half circumferential portion of the peripheral wall portion 12 in the circumferential direction faces the airbag 200. Here, a portion of the peripheral wall portion 12, facing the airbag 200 in the airbag module assembly 1000C, is referred to as a facing portion 121. In the gas generator 100C according to the second embodiment, the gas discharge ports 11 are formed only in the facing portion 121 of the peripheral wall portion 12. However, the present disclosure is not limited to this configuration. For example, when the airbag module assembly 1000C is applied to a side airbag device, the gas discharge ports 11 may be formed along the entire circumference of the peripheral wall portion 12.

As illustrated in FIG. 6, in the gas generator 100C according to the second embodiment, the temperature rise suppressing member 7 is provided in contact only with the outer surface side S12 of the facing portion 121 which is a portion of the housing 1C facing the airbag 200. The temperature rise suppressing member 7 is provided to cover the entire region of the facing portion 121 except for the gas discharge ports 11. More specifically, the temperature rise suppressing member 7 air-tightly contacts the outer surface S12 in the entire region of the facing portion 121, which is a portion of the housing 1C where the temperature rise suppressing member 7 is disposed.

In the second embodiment, when the igniter 41 is actuated, a combustion product of an ignition agent is released into the first combustion chamber 56, the first gas generating agent 110 accommodated in the first combustion chamber 56 combusts, and the combustion gas is generated. The combustion gas of the first gas generating agent 110 is released to the second combustion chamber 57 through the through holes 91 of the partition wall member 9. Then, the combustion gas of the first gas generating agent 110 comes into contact with the second gas generating agent 120, and the second gas generating agent 120 is ignited. The combustion of the second gas generating agent 120 generates high-temperature and high-pressure combustion gas in the second combustion chamber 57. The combustion gas passes through the communication holes 52 and the filter 6 to be cooled and filtered, and then passes through the gap 13 to be released from the gas discharge ports 11 to the exterior of the gas generator 100C. The combustion gas of the second gas generating agent 120 is released to the exterior of the gas generator 100C and then flows into the airbag 200 in the module case 600. When the airbag 200 is expanded by supply of the gas, the front portion 702 of the airbag cover 700 is ruptured by the expansion pressure, and the airbag 200 pops out of the module case 600 and inflates in front of the occupant. As a result, a cushion is formed between the occupant and a rigid structure, and the occupant is protected from the impact.

In the airbag module assembly 1000C according to the second embodiment, the gas generator 100C is disposed in such a manner that the facing portion 121 of the peripheral wall portion 12 and the airbag 200 in a folded state face each other. Therefore, the airbag 200 having contracted after inflation is in a state of easily coming into contact with the facing portion 121 of the housing 1C. On the other hand, in the gas generator 100C according to the present embodiment, the temperature rise suppressing member 7 is provided in contact with the outer surface S12 of the facing portion 121 of the housing 1C. Therefore, in the housing 1C, the temperature rise is suppressed at the facing portion 121 which is a contact portion with the temperature rise suppressing member 7. Thus, the temperature of the facing portion 121 of the airbag module assembly 1000C facing the airbag 200 is prevented from becoming excessively high. As a result, in the present embodiment, it is possible to reduce the thermal influence on the airbag 200 which is a component disposed to face the facing portion 121 of the housing 1C.

As described above, in the gas generator 100C according to the second embodiment, by providing the temperature rise suppressing member 7 on the outer surface S12 of the peripheral wall portion 12, it is possible to reduce the thermal influence on components disposed around the peripheral wall portion 12 of the housing 1C. Note that the temperature rise suppressing member 7 may be provided to be in contact with the entire peripheral wall portion 12.

Other

While the embodiments of the technique according to the present disclosure have been described above, each aspect disclosed in the present specification can be combined with any other features disclosed in the present specification.

REFERENCE SIGNS LIST

1 Housing
4 Ignition device
7 Temperature rise suppressing member
8 Label sheet
11 Gas discharge port
12 Peripheral wall portion
22 Top plate portion (example of first closing portion)
32 Bottom plate portion (example of second closing portion)
100 Gas generator
110 First gas generating agent (example of gas generating agent)
120 Second gas generating agent (example of gas generating agent)
200 Airbag
1000 Airbag module assembly

The invention claimed is:

1. A gas generator comprising:

a gas generating agent that generates gas by combustion;

a housing made of metal, the housing accommodating the gas generating agent therein, the housing having a gas discharge port formed therein, through which the gas generated by combustion of the gas generating agent is emitted to an exterior of the housing;

an ignition device configured to ignite the gas generating agent by actuation; and a temperature rise suppressing member provided in contact with an outer surface of the housing to cover at least a part of the outer surface, wherein the temperature rise suppressing member includes: an endothermic agent that absorbs heat of the housing by undergoing a chemical change or a state change by the heat of the housing when a temperature of the housing rises due to combustion of the gas generating agent; and a binder agent present together with the endothermic agent such that the temperature rise suppressing member has flexibility.

2. The gas generator according to claim 1, wherein the binder agent is mixed in the endothermic agent.

3. The gas generator according to claim 1, wherein the endothermic agent includes at least one type selected from the group consisting of fatty acid polycarbonate, magnesium carbonate, fumaric acid, and terephthalic acid.

4. The gas generator according to claim 1, wherein the binder agent includes a compound having a hydroxyl group or a carbonyl group.

5. The gas generator according to claim 1, wherein a content ratio of the endothermic agent in the temperature rise suppressing member is 70% or greater and 95% or less, and a content ratio of the binder agent in the temperature rise suppressing member is 5% or greater and 30% or less.

6. The gas generator according to claim 1, wherein the housing includes: a peripheral wall portion having a tubular shape, the peripheral wall portion having the gas discharge port formed therein; a first closing portion closing one end portion of the peripheral wall portion; and a second closing portion closing the other end portion of the peripheral wall portion, the gas discharge port is formed at a position where a distance between the gas discharge port and the first closing portion is shorter than a distance between the gas discharge port and the second closing portion in an axial direction of the housing, and the temperature rise suppressing member is provided on an outer surface of the first closing portion.

7. An airbag module assembly comprising:

the gas generator according to claim 6; and an airbag disposed in a folded state, the airbag being configured to be expanded and inflated by the gas emitted from the gas discharge port, wherein the gas generator is disposed in such a manner that the first closing portion and the airbag in a folded state face each other.

8. The gas generator according to claim 1, wherein the housing includes a peripheral wall portion having a tubular shape, the peripheral wall portion having the gas discharge port formed therein, and the temperature rise suppressing member is provided on an outer surface of the peripheral wall portion.

9. An airbag module assembly, comprising:

the gas generator according to claim 8; and an airbag disposed in a folded state, the airbag being configured to be expanded and inflated by the gas emitted from the gas discharge port, wherein the gas generator is disposed in such a manner that the peripheral wall portion and the airbag in a folded state face each other, and the temperature rise suppressing member is provided on an outer surface of a portion of the peripheral wall portion facing the airbag.

10. The gas generator according to claim 1, wherein a contact portion of the outer surface of the housing with the temperature rise suppressing member is formed to have recesses and protrusions.

11. The gas generator according to claim 1, further comprising a label sheet indicating predetermined information, wherein the label sheet is attached to the temperature rise suppressing member in such a manner that the temperature rise suppressing member is interposed between the label sheet and the housing.

* * * * *